(12) United States Patent
Schmid et al.

(10) Patent No.: US 11,549,599 B2
(45) Date of Patent: Jan. 10, 2023

(54) ROTARY DISC TYPE DIVERTER VALVE FOR BULK MATERIAL HANDLING

(71) Applicant: CYCLONAIRE CORPORATION, York, NE (US)

(72) Inventors: Scott Michael Schmid, York, NE (US); Zackary James Bonick, Lincoln, NE (US)

(73) Assignee: CYCLONAIRE CORPORATION, York, NE (US)

( * ) Notice: Subject to any disclaimer, the term of this patent is extended or adjusted under 35 U.S.C. 154(b) by 0 days.

(21) Appl. No.: 17/022,987

(22) Filed: Sep. 16, 2020

(65) Prior Publication Data

US 2021/0088147 A1 Mar. 25, 2021

Related U.S. Application Data

(60) Provisional application No. 62/904,467, filed on Sep. 23, 2019.

(51) Int. Cl.
| | |
|---|---|
| *F16K 11/074* | (2006.01) |
| *F16K 25/00* | (2006.01) |
| *F16K 27/04* | (2006.01) |
| *B65G 47/72* | (2006.01) |
| *B65G 53/56* | (2006.01) |

(52) U.S. Cl.
CPC ............ *F16K 11/074* (2013.01); *F16K 25/00* (2013.01); *F16K 27/04* (2013.01); *B65G 47/72* (2013.01); *B65G 53/56* (2013.01)

(58) Field of Classification Search
CPC ........ F16K 11/074; F16K 25/00; F16K 27/04; B65G 47/72; B65G 53/56
See application file for complete search history.

(56) References Cited

U.S. PATENT DOCUMENTS

| | | | |
|---|---|---|---|
| 1,283,822 A | * | 11/1918 | Lehman ............. B65G 69/0408 414/272 |
| 1,375,205 A | | 4/1921 | Budzinsky |
| 2,360,389 A | | 10/1944 | Bergman |
| 2,380,647 A | | 7/1945 | Henderson |

(Continued)

FOREIGN PATENT DOCUMENTS

DE 755136 8/1951

OTHER PUBLICATIONS

UNICAST, Data Sheet: Valves & Pipes, Diverter Valves, 2018, UNICAST.CA, 2 pages.

(Continued)

*Primary Examiner* — Matthew W Jellett
*Assistant Examiner* — Christopher D Ballman
(74) *Attorney, Agent, or Firm* — Greer, Burns & Crain, Ltd (57) ABSTRACT

A diverter valve is provided for use in directing a flow of bulk material from a source to at least one receiver. Included in the present diverter valve is an inlet housing having an inlet port and partially defining a valve chamber, an outlet housing connected to the inlet housing, having at least one outlet port and defining an end of the valve chamber. A rotating disc is rotatably disposed in the chamber and constructed and arranged for selectively creating fluid communication between the inlet port and diverting the flow to a selected one of the at least one outlet port.

16 Claims, 7 Drawing Sheets

(56) References Cited

U.S. PATENT DOCUMENTS

| | | | | |
|---|---|---|---|---|
| 2,436,624 | A | * | 2/1948 | Volk .................. B65G 47/72 193/23 |
| 2,467,945 | A | * | 4/1949 | Pottmeyer ............... C21B 9/12 137/340 |
| 3,506,238 | A | | 4/1970 | Bertels |
| 3,509,912 | A | | 5/1970 | James |
| 3,590,872 | A | | 7/1971 | Balty |
| 3,620,255 | A | * | 11/1971 | Stillman ................ F16K 3/10 137/625.45 |
| 3,924,832 | A | * | 12/1975 | Babcock ................ F16K 3/04 251/301 |
| 4,019,535 | A | | 4/1977 | Buckethal |
| 4,177,940 | A | * | 12/1979 | McHugh ............. B05B 5/1683 222/227 |
| 4,382,450 | A | * | 5/1983 | Tennick ................ F16K 3/10 137/242 |
| 4,442,865 | A | | 4/1984 | Shigeo |
| 4,469,135 | A | | 9/1984 | Gray |
| 4,696,643 | A | * | 9/1987 | Szody ................ A23L 3/18 137/625.41 |
| 4,751,948 | A | * | 6/1988 | Hertig .................. B65B 1/36 128/203.15 |
| 5,029,624 | A | * | 7/1991 | McCunn ................ F16L 37/34 141/346 |
| 6,085,809 | A | * | 7/2000 | Woodruff ........... B65D 81/3211 141/346 |
| 6,196,417 | B1 | * | 3/2001 | Johnson ................ F16K 3/085 137/625.31 |
| 6,213,450 | B1 | * | 4/2001 | Palmer .................... F16K 5/205 137/15.06 |
| 6,283,339 | B1 | * | 9/2001 | Morrow .................. G01F 23/24 222/142.9 |
| 6,516,810 | B1 | * | 2/2003 | Haul ...................... A24C 5/323 131/108 |
| 8,177,095 | B1 | * | 5/2012 | Renyer ..................... A01C 1/06 222/56 |
| 8,833,614 | B2 | * | 9/2014 | Webster ................ G01F 11/46 222/370 |
| 9,810,363 | B2 | * | 11/2017 | Ganzer ................ F16K 3/0281 |
| 10,399,798 | B1 | * | 9/2019 | Siddens ................. B65G 53/40 |
| 10,422,433 | B2 | * | 9/2019 | Tanaka ...................... F16K 3/04 |
| 10,562,062 | B2 | * | 2/2020 | Dobizl .................. F16K 15/026 |
| 10,753,483 | B2 | * | 8/2020 | Feiler .................... B65G 69/183 |
| 10,865,896 | B2 | * | 12/2020 | Zonneveld .............. F16K 11/22 |

OTHER PUBLICATIONS

FLSMIDTH, Data Sheet: 2-way SK Diverter Valves, 2006, www.fls-pt.com, 4 pages.

Dynamic Air Inc, Data Sheet: Multi-Port Switch, Series 620, 2016, www.dynamicair.com, 1 page.

Dynamic Air Inc, Data Sheet: Multi-Port Switch: Series 676, 2016, www.dynamicair.com, 2 pages.

\* cited by examiner

ROTARY DISC TYPE DIVERTER VALVE FOR BULK MATERIAL HANDLING

RELATED APPLICATION

The present application is a Non-Provisional of, and claims 35 U.S.C. 119 priority from, U.S. Provisional Application No. 62/904,467 filed Sep. 23, 2019, the contents of which are incorporated by reference herein.

BACKGROUND

The present invention relates generally to devices for handling bulk materials, and more specifically to an improved diverter valve for use in directing flow from a source of such material to a selected receiving reservoir.

In bulk material handling installations, material is conveyed, through pressure differential, from a source such as a rail car, material hopper, storage bin or the like to a designated receiving reservoir or receptacle. One such bulk material is dry silica sand, however other materials are contemplated, including but not limited to grain, granular fertilizer, dry ingredients for cement and the like. Receiving reservoirs are well known in the art, and include but are not limited to storage bins, silos, rail cars, pipelines or other structures. Diverter valves are commonly employed for regulating and directing the flow to a selected type of receiving reservoirs. In most cases, diverter valves are operated under operator control, whether manually powered, or powered by electric, hydraulic or pneumatic motors.

In one type of conventional diverter valve, the valve housing includes an internal rotating component having a curved pipe that rotates as the desired reservoir is selected. A drawback of this type of valve is that inability to transfer between selected receiving reservoirs with material still present in the valve. Depending on the bulk product being handled, the material flow is also abrasive. Often, such valves cannot be actuated without purging the housing of bulk material to reduce the loading from the stored/entrapped bulk material. Another drawback of such valves is that inflatable seals are often used to control the escape of unwanted dust and debris. When the housing needs to be evacuated and the inflatable seals temporarily deflated, a common side effect is an escape of dust from the system.

Another conventional diverter valve employs a sliding disc diverter, which is a hardened, layover metal disc to periodically cover or block at least one non-selected port in the housing. An armature used for positioning the disc is positioned inside the valve housing, and is exposed to the abrasive flow of material, as well as to the loading generated by flowing material, requiring additional energy for rotating the disc. Still another drawback of such valves is that seals used to prevent unwanted escape of dust are directly exposed to the abrasive material flow, which causes them to deteriorate relatively rapidly, shortening their operational life.

Thus, there is a need for an improved diverter valve for use with bulk materials that addresses and overcomes the above-identified drawbacks of conventional devices.

SUMMARY

The above-listed need is met or exceeded by the present diverter valve, which receives flow from a single inlet and selectively directs material flow to one of a plurality of potential outlets, while also preventing flow to or from all non-selected outlets. One feature of the present valve is that it is designed to resist abrasive wear caused by the inherent friction and velocity presented by the bulk material flowing through the valve. As such, operational life is prolonged. Another feature of the present valve is the ability to change flow position without a need for evacuating the valve body. Still another feature is that the seal, located between a diverter disc and an outlet wall of the housing, does not allow bulk material to escape to atmosphere, but is protected from direct contact with the flow of material in the valve housing.

In an embodiment, the present valve features an enlarged, frusto-conically shaped inlet housing, which stores a supply of conveyed bulk material which acts autogenously, protecting the walls of the housing from abrasive wear. Also, the seals used to prevent escape of bulk material particles during operation and as the diverter disc is moving are protected from abrasion by being located behind the rotating diverter disc, which is in direct contact with the flow of bulk material. In the preferred embodiment, due to the configuration and orientation of the diverter disc, diversion is accomplished without requiring to empty the inlet housing of material. Further, the present diverter valve is completely enclosed, preventing any form of external bulk material leakage of the system in the event of a seal failure.

More specifically, a diverter valve is provided for use in directing a flow of bulk material from a source to at least one reservoir. Included in the present diverter valve is an inlet housing having an inlet port and partially defining a valve chamber, an outlet housing connected to the inlet housing, having at least one outlet port and defining an end of the valve chamber. A rotating disc is rotatably disposed in the chamber and constructed and arranged for selectively creating fluid communication between the inlet port and diverting the flow to a selected one, of at least one outlet port.

In an embodiment, the diverter valve includes an inlet housing configured for receiving and retaining a portion of the flow so that the bulk material passes autogenously through the valve chamber. Included in the valve is at least one seal disposed in operational relationship to each outlet port to prevent leakage of the material outside of the intended outlet port. Preferably, each seal is located between the rotating disc and the outlet housing. In one embodiment, the rotating disc has an inlet surface, an opposite outlet surface slidingly engaging an inner surface of the outlet housing, and each seal is located between the outlet surface and the inner surface.

Also included in the present valve is one or more outlet pipes, each connected to the outlet housing and having a first end connected to the outlet housing and an opposite second end connected to the at least one receptacle or receiving reservoir. The first end is connected to the outlet housing to form a mating engagement. In one embodiment, the mating engagement is achieved by providing a plurality of peripherally spaced lugs on one of the first end and the outlet housing, and a like plurality of peripherally spaced notches on the other of the first end and the outlet housing.

In a preferred embodiment, the rotating disc has an inlet surface, an opposite outlet surface slidingly engaging an inner surface of the outlet housing and an opening allowing for the flow to pass through to a selected one of the outlet ports, the opening being radially displaced between an axis of the disc and a peripheral edge of the disc. It is also preferred that the valve chamber is frusto-conically shaped, and expands in radius from the inlet port to the rotating disc. The valve chamber is defined in part by an inclined wall of the inlet housing that is constructed and arranged to receive a supply of the bulk material to cover the inner surface of the valve chamber, allowing for resistance to abrasive wear.

In addition, the inlet port is axially spaced from said at least one outlet port by the valve chamber. It is also preferred that the inlet port is generally horizontally aligned with the outlet port.

DETAILED DESCRIPTION

Figure 1:
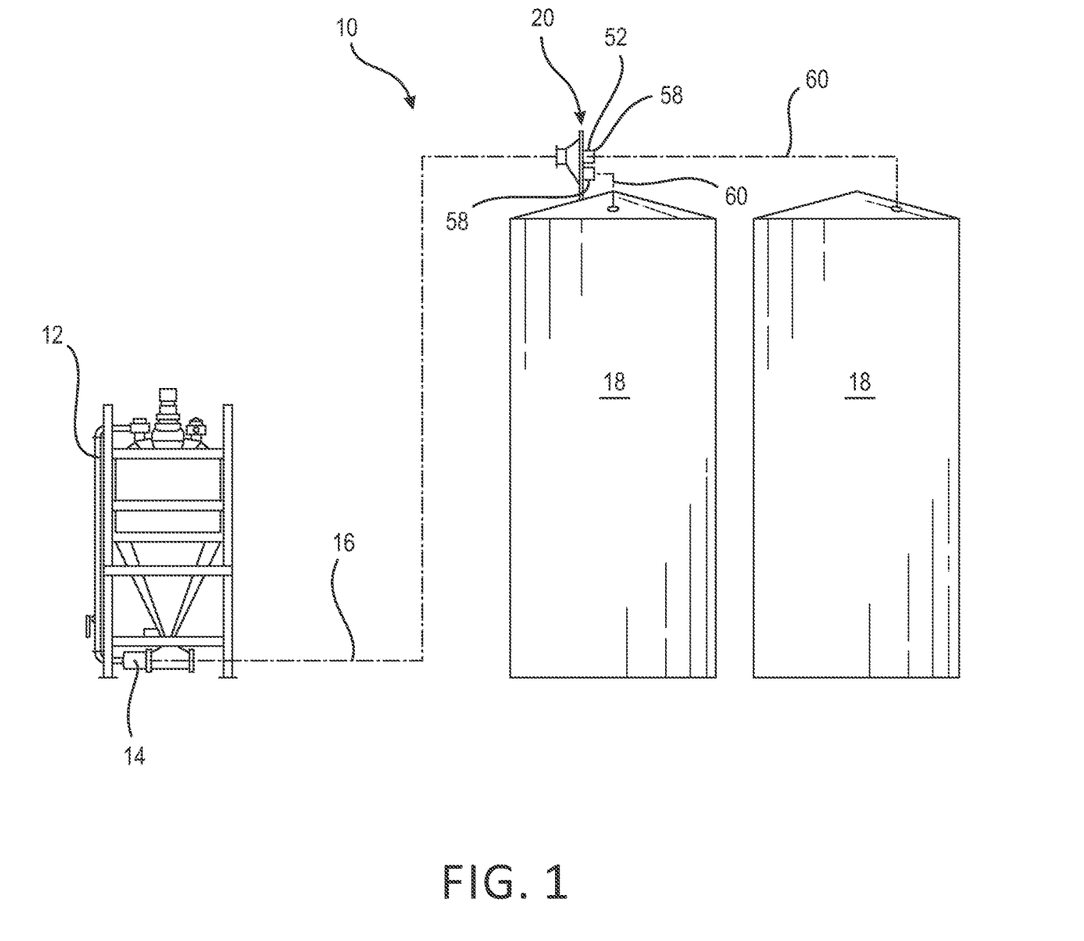
FIG. 1 is a side schematic view of a bulk material handling system equipped with the present diverter valve.
Figure 2:
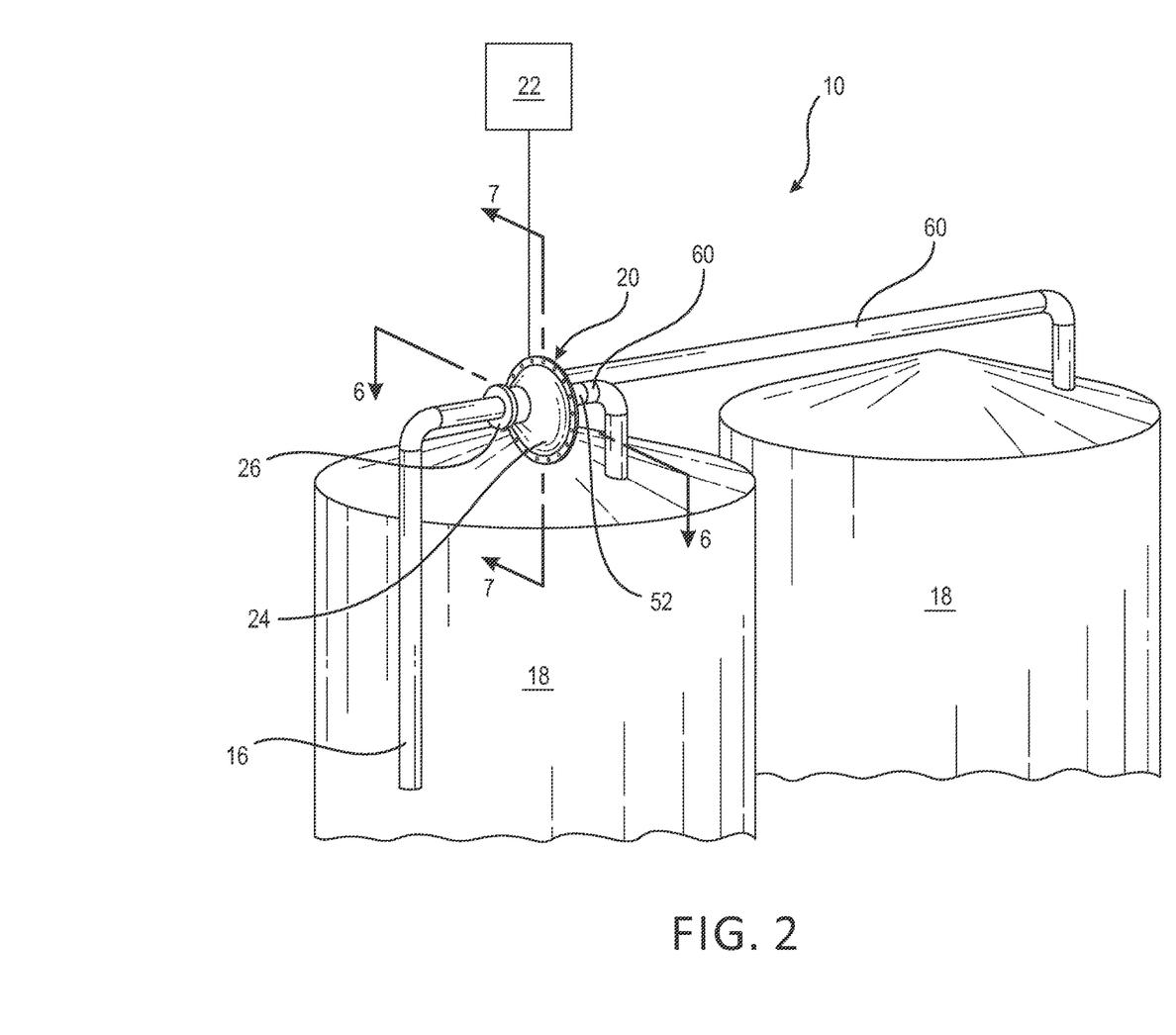
FIG. 2 is an enlarged fragmentary perspective view of the system of FIG. 1.

Referring now to FIGS. 1 and 2, a bulk material handling system is generally designated 10, and is used for conveying granular or particulate materials, including but not limited to sand, silica sand, agricultural grains, dry ingredients for cement, granular fertilizer, and the like. A source of material 12 is depicted as a fixed hopper, but is contemplated as being a rail car, semi-trailer or even a pipeline. A blower or pump 14, used alone or with gravity, transmits the bulk material through a pipeline 16, to one of a selected group of reservoirs or receptacles 18, here silos, however storage tanks, rail cars or other known structures are contemplated.

Diversion of the flow of the bulk material to the designated reservoir 18 is achieved using the present diverter valve, generally designated 20. The valve 20 is under the remote control of an operator (not shown), using a conventional control system, generally designated 22. As is well known in the art, the control system 22 is connected to a conventional power source, such as line voltage, or is wirelessly operated.

Figure 3:
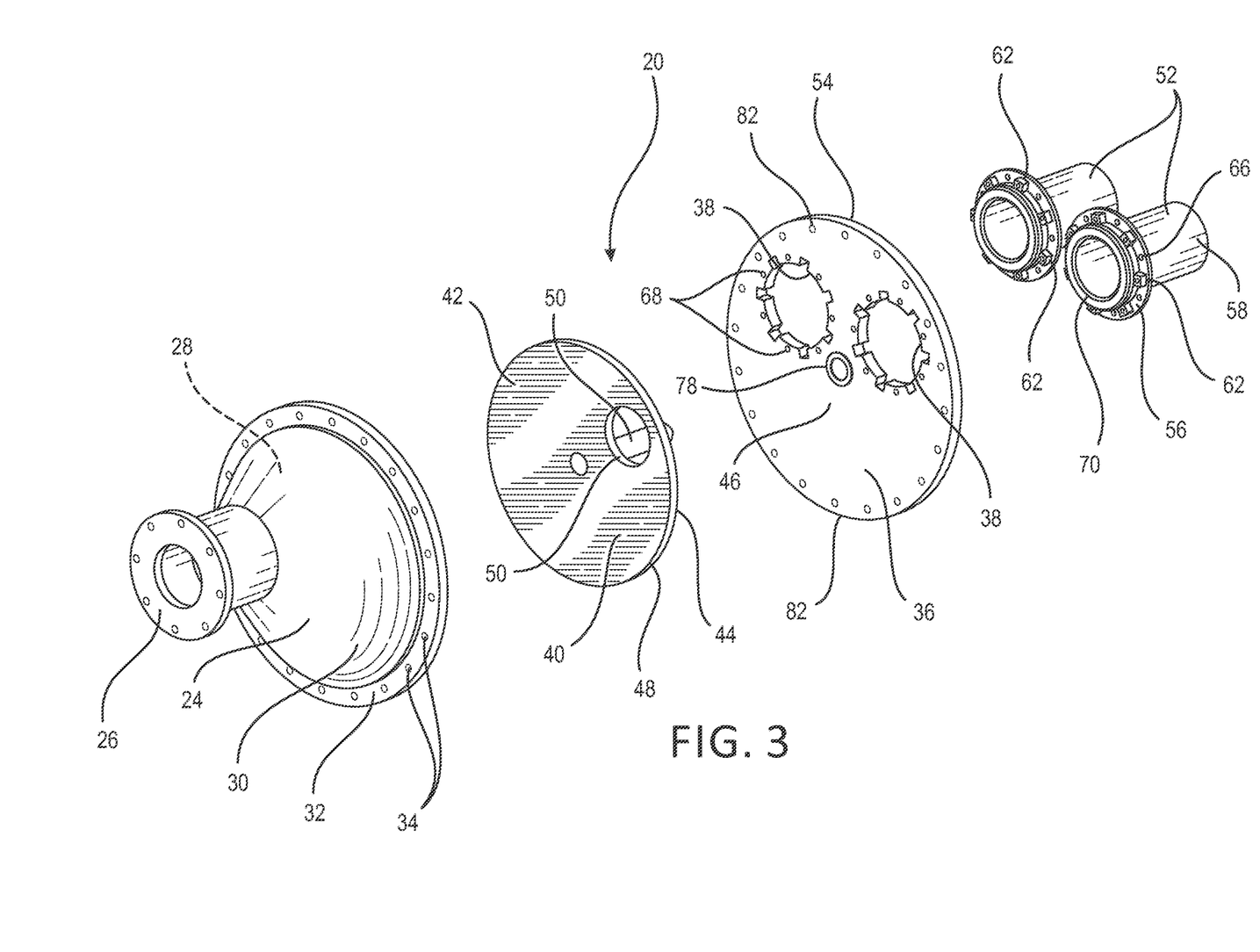
FIG. 3 is an exploded perspective view of the present diverter valve.
Figure 3A:
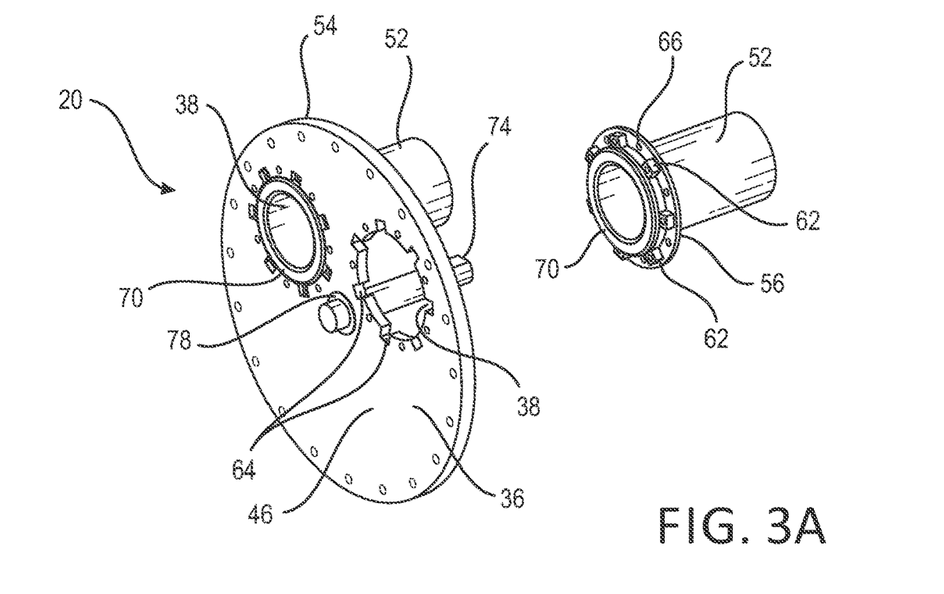
FIG. 3A is an enlarged fragmentary perspective view of the diverter valve of FIG. 3.
Figure 3B:
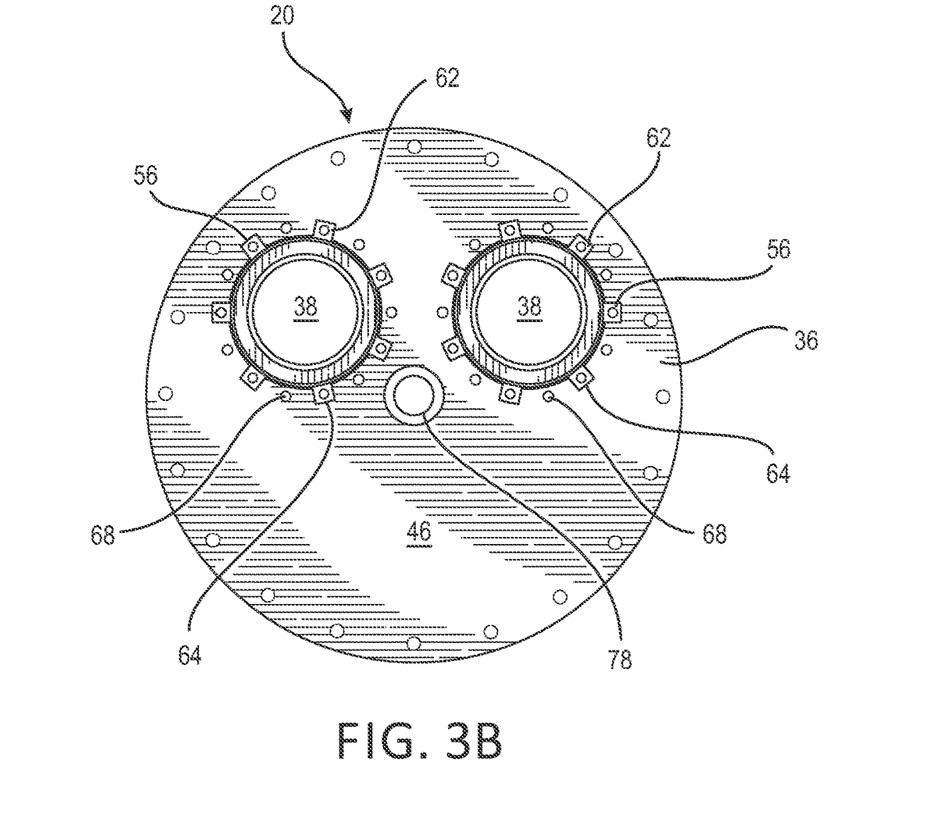
FIG. 3B is a front view of the outlet housing of the present diverter valve.
Figure 4:
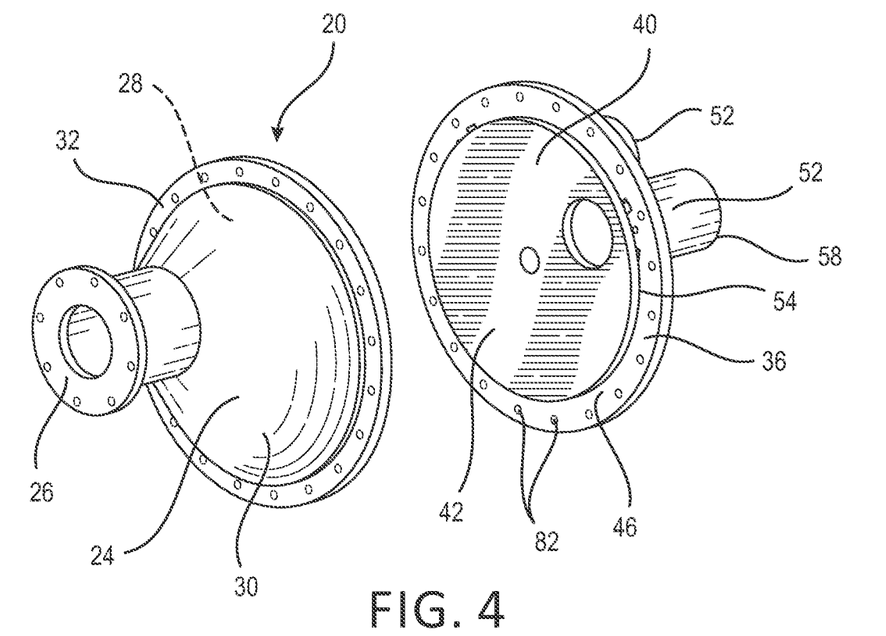
FIG. 4 is a partially exploded perspective view of the present diverter valve with the valve disc in a first position.
Figure 5:
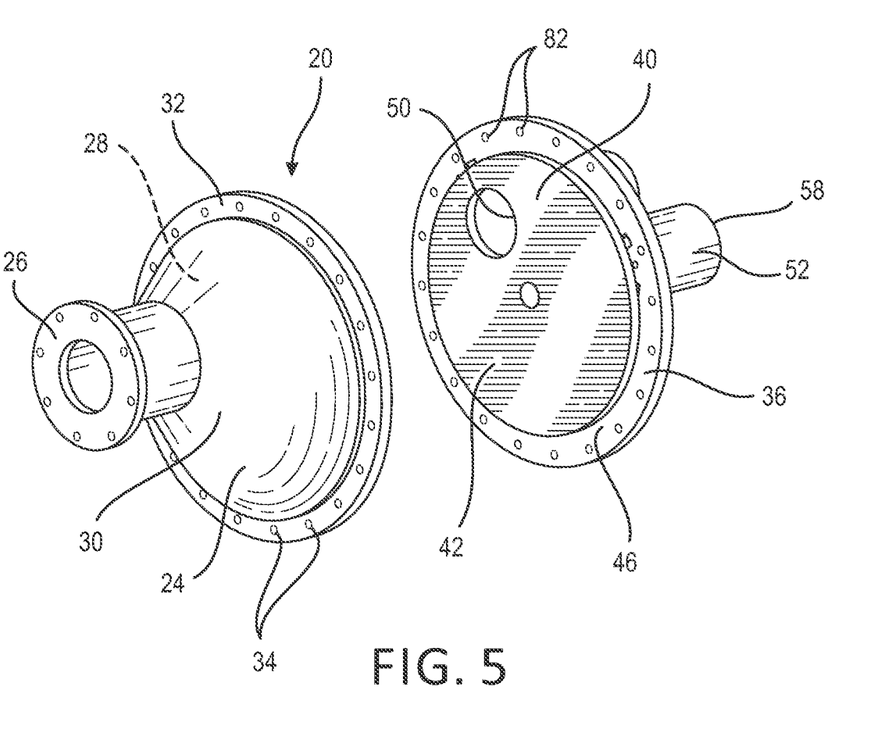
FIG. 5 is a partially exploded perspective view of the present diverter valve with the valve disc in a second position.

Referring now to FIGS. 3, 3A and 3B, the present diverter valve 20 is shown in greater detail. An inlet housing 24 has an inlet port 26 constructed and arranged to be in fluid communication with the pipeline 16, and partially defines a valve chamber 28. In the preferred embodiment, the valve chamber 28 is frusto-conically shaped due to an exterior wall 30 of the inlet housing. A radially extending flange 32 is provided with a plurality of mounting holes 34.

An outlet housing 36 is connected to the inlet housing 24, in the preferred embodiment being generally planar in shape and defining an end of the valve chamber 28. Included in the outlet housing is at least one, and preferably a plurality of outlet ports 38. While two outlet ports 38 are shown, it is contemplated that the number may vary to suit the application, and depends on the number of reservoirs 18 to which material may be transferred at a particular location.

Sandwiched between the inlet housing 24 and the outlet housing 36 is a rotating disc 40 rotatably disposed in the valve chamber 28 and constructed and arranged for selectively creating fluid communication between the inlet port 26 and diverting the flow to a selected one of the outlet ports 38. More specifically, the rotating disc 40 preferably has an inlet surface 42, an opposite outlet surface 44 engaging an inner surface 46 of the outlet housing 36, and a peripheral edge 48. Also provided on the disc 40 is a flow opening 50 dimensioned to receive bulk material flow from the inlet port 26 and to transmit the flow to a designated one of the outlet ports 38, as needed, under the control of the control system 22, which rotates the disc 40 within the valve chamber 28 as described below.

At least one outlet pipe 52 is connected to an outer surface 54 of the outlet housing 36, and each such pipe is in registry with a corresponding one of the outlet ports 38. Each outlet pipe 52 is provided with a first end 56 connected to the outlet housing 36 and an opposite, second end 58 connected to the at least one receptacle 18 through associated piping 60 (FIG. 2). The connection of the first end 56 to the outlet ports 38 of the outlet housing 36 is configured for forming a mating engagement, in which the outlet pipes 52 are non-rotatably attached to the outlet housing. In the preferred embodiment, this mating engagement takes the form of a plurality of peripherally spaced, box-like lugs 62 on the first end 56, and a like plurality of peripherally spaced notches 64 on the outlet housing 36. The notches 64 are dimensioned to matingly accommodate the lugs 62. It is also contemplated that the notches 64 are optionally mounted on the first end 56 and the lugs 62 on the outlet housing 36, depending on the application. Further, the outlet pipes 52 are preferably provided with mounting bores 66 for securing the pipes to corresponding holes 68 on the outlet housing 36 using fasteners (not shown) as are known in the art, including but not limited to threaded fasteners, rivets, and the like. It is also contemplated that the specific engaging structure connecting the outlet pipes 52 with the outlet housing 36 may vary to suit the application, and other configurations are considered suitable.

Also included on the first end 56 of the outlet pipe 52 is a resilient seal 70, secured within a diameter defined by the lugs 62 and the notches 64 so that once the pipe is secured to the outlet housing 36, specifically to the outlet port 38, the seal projects into the valve chamber 28 for contacting the disc 40. In the preferred embodiment, the seal 70 is annular or ring-shaped, however other shapes, or materials are contemplated, including but not limited to inflatable seals.

An important feature of the present valve 20 is the prevention of the flow of material outside a designated or intended flow path. This feature is achieved by the use of seals 70 which preferably inflate once the disc 40 is in the desired position Inflation of the seal 70 creates an enclosed pathway between the disc 40 and the outlet housing 36 so that any flow of stray particles is significantly reduced. In the preferred embodiment, inflation of the seal 70 is achieved automatically, however it is also contemplated to be under operator control. A feature of the present valve 20 is that the location of the seal 70 between the rotating disc 40 and the inner surface 42 of the outlet housing 36 protects the internal valve components from the abrasive action of the flowing bulk material as the material is transferred from the valve chamber 28 to the outlet pipes 52.

Referring again to the rotating disc 40, the opening 50 is preferably located on a radius between an axis of the disc and the peripheral edge 48. Also, the disc 40 is provided with an axially projecting shaft 74 extending from the outlet surface 44 towards the outlet housing 36. The shaft 74 has a length sufficient to enable the shaft to project through the outlet housing 36 and be engaged by a power source 76 (FIG. 7), preferably an electric, hydraulic or pneumatic motor, depending on the application. Suitable motors 76 are well known in the art, engage the shaft 76 through a key arrangement, a gear drive or the like, and are controlled by the control system 22 for rotating the disc 40 for selectively aligning the opening 50 in the disc with a selected one of the outlet ports 38. An annular bearing 78 (FIGS. 3, 3A, 3B in the outlet housing 36 rotatably accommodates the shaft 74.

Referring now to FIGS. 4 and 5 and 8 and 9, it will be understood that when the rotating disc 40 is positioned to align the opening 50 with a selected one of the outlet ports 38, the other port will be blocked from the flow of bulk material.

Figure 6:
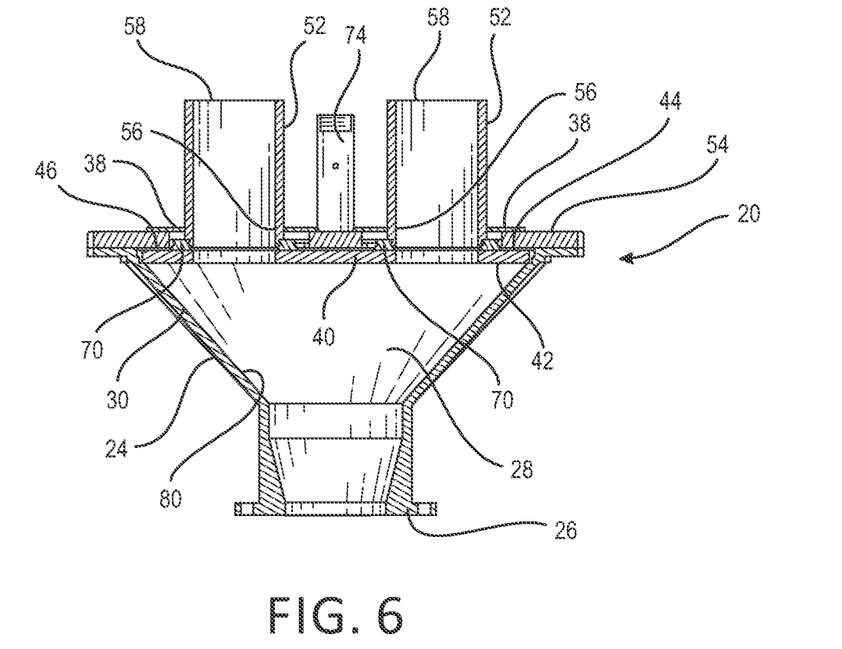
FIG. 6 is a vertical cross-section of the assembled present diverter valve taken along the line 6-6 of FIG. 2.
Figure 7:
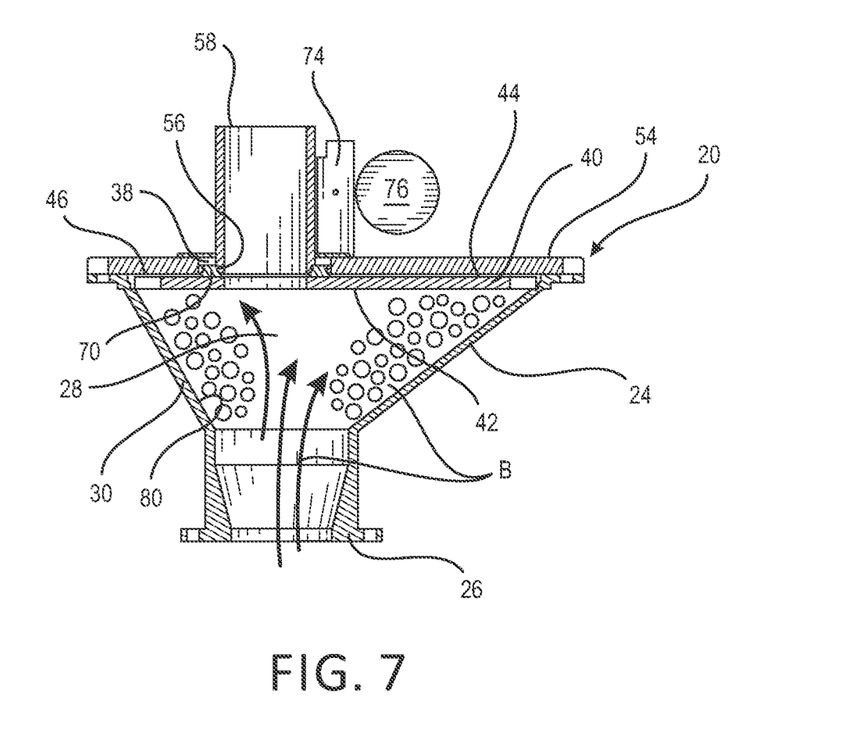
FIG. 7 is a vertical cross-section of the assembled present diverter valve taken along the line 7-7 of FIG. 2.
Figure 8:
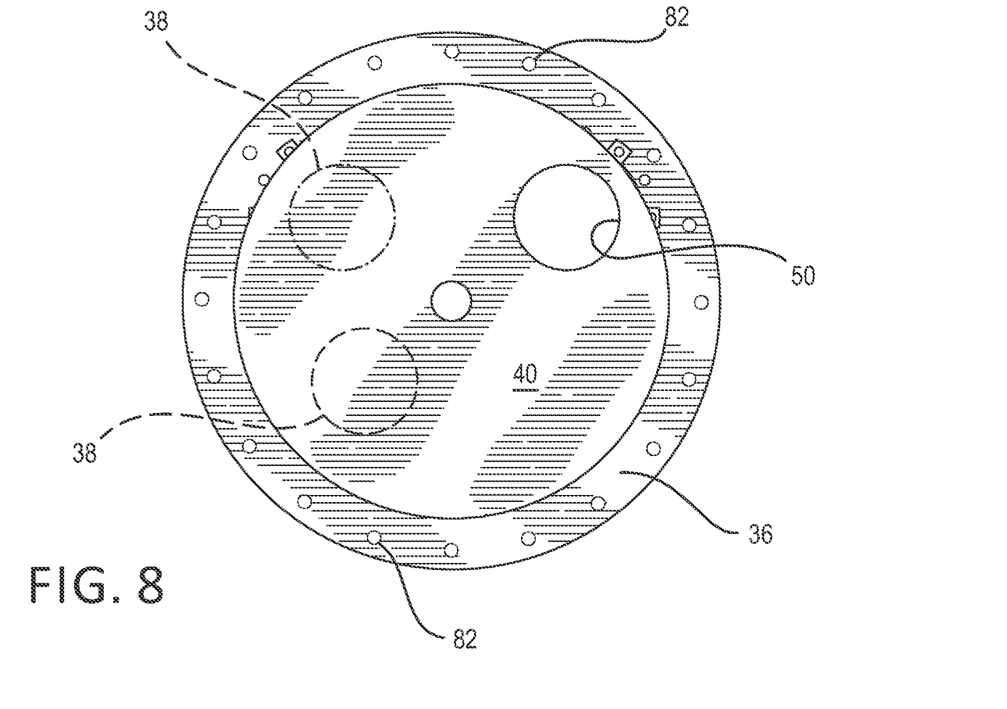
FIG. 8 is a fragmentary front elevation of the present diverter valve as seen in FIG. 4.
Figure 9:
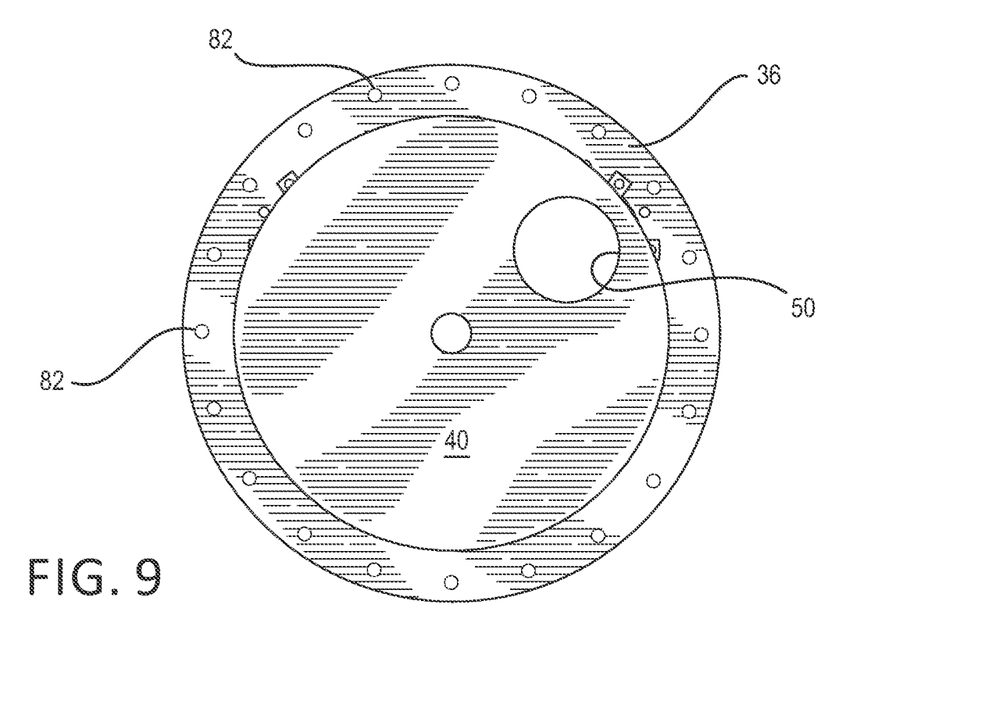
FIG. 9 is a fragmentary front elevation of the present diverter valve.

Referring now to FIGS. 6 and 7, another feature of the present diverter valve 20 is that the inlet housing 24 is configured for receiving and retaining a portion of the flow of bulk material so that the bulk material "B" passes autogenously through the valve chamber 28. The valve chamber 28 expands in radius from the inlet port to the rotating disc 40, and this frusto-conical shape is created by the exterior wall 30. Also, the inlet port 26 is offset vertically from an axis of the inlet housing 24, and thus the exterior wall 30, and accordingly the inlet housing is defined in part by an inclined wall portion 80 of the inlet housing that is constructed and arranged to receive a supply of the bulk material to coat an inner surface of the valve chamber 28, allowing for resistance to abrasive wear.

It will also be seen that the inlet port 26 is axially spaced from the outlet ports 38 by the valve chamber 28. In addition, as seen in FIG. 7, the inlet port 26 is generally horizontally aligned with the at least one outlet port 38 and the outlet pipes 52. The valve 20 is assembled by placing fasteners in the mounting holes 34 in the flange 32, which retain the rotary disc 40 in the valve chamber 28 once the inlet housing 24 is secured to the outlet housing 36 via the fasteners (not shown) engaging corresponding mounting openings 82 in the outlet housing 36.

While a particular embodiment of the present rotary disc type diverter valve for bulk material conveying has been described herein, it will be appreciated by those skilled in the art that changes and modifications may be made thereto without departing from the invention in its broader aspects and as set forth in the following claims.

What is claimed is:

1. A diverter valve for use in directing a flow of particulate bulk material from a source to at least one receptacle, comprising:
    an inlet housing with a frusto-conical shape and having an inlet port and partially defining a valve chamber;
        a generally planar outlet housing connected to said inlet housing, having at least one outlet port and defining an end of said valve chamber, said at least one outlet port and said inlet port being generally aligned along a common horizontal axis; and
        a rotating planar disc rotatably disposed in said chamber closer to said at least one outlet port than to said inlet port and constructed and arranged for selectively creating fluid communication between said inlet port and diverting the flow of particulate material to a selected one of said at least one outlet port.

2. The diverter valve of claim 1 wherein said inlet housing is configured for receiving and retaining a portion of the flow so that the bulk material passes autogenously through said chamber.

3. The diverter valve of claim 1 further including at least one seal disposed in operational relationship to each said outlet port to prevent leakage of the material.

4. The diverter valve of claim 3 wherein each said at least one seal is located between said rotating disc and said outlet housing.

5. The diverter valve of claim 4 wherein said rotating disc has an inlet surface, an opposite outlet surface slidingly engaging an inner surface of said outlet housing, and each said at least one seal is located between said outlet surface and said inner surface for contacting said rotating disc.

6. The diverter valve of claim 1 further including one or more outlet pipes each connected to said outlet housing and having a first end connected to said outlet housing and an opposite second end connected to the at least one receptacle, said first end having a plurality of peripherally spaced lugs each constructed and arranged to engage a corresponding notch in said outlet housing.

7. The diverter valve of claim 1 further including one or more outlet pipes each connected to said outlet housing and having a first end connected to said outlet housing and an opposite second end connected to the at least one receptacle, said first end connected to said outlet housing to form a mating engagement.

8. The diverter valve of claim 7, wherein said mating engagement is achieved by providing a plurality of peripherally spaced lugs on one of said first end and said outlet housing, and a like plurality of peripherally spaced notches on the other of said first end and said outlet housing.

9. The diverter valve of claim 1, wherein said rotating disc has an inlet surface, an opposite outlet surface engaging an inner surface of said outlet housing and an opening allowing for the flow to pass through to a selected one of said at least one outlet ports, said opening being radially displaced between an axis of said disc and a peripheral edge of said disc, an inflatable seal being disposed between said opening and said outlet housing for controlling the flow to said one of at least one outlet ports.

10. The diverter valve of claim 9, wherein said rotating disc is provided with an axially projecting shaft extending from an outlet surface towards said outlet housing.

11. The diverter valve of claim 10, further including at least one bearing in said outlet housing constructed and arranged for rotatably accommodating said shaft.

12. The diverter valve of claim 1, wherein said valve chamber is defined in part by an inclined wall of said inlet housing that is constructed and arranged to receive a supply of the bulk material to coat an inner surface of said valve chamber, allowing for resistance to abrasive wear.

13. The diverter valve of claim 1, wherein said inlet port is generally horizontally aligned with said at least one outlet port.

14. The diverter valve of claim 1, wherein said inlet housing has a flange axially projecting from said housing for engaging a corresponding peripheral edge of said outlet housing.

15. The diverter valve of claim 1, further including a power source connected to said rotating disc for rotating said disc for selectively aligning an opening in said disc with a selected one of said outlet ports.

16. A diverter valve for use in directing a flow of particulate bulk material from a source to at least one receptacle, comprising:

an inlet housing having an inlet port and partially defining a valve chamber;

a generally planar outlet housing connected to said inlet housing, having a plurality of outlet ports and defining an end of said valve chamber;

a rotating planar disc rotatably disposed in said chamber closer to said outlet ports than to said inlet ports and having a single aperture constructed and arranged for selectively creating fluid communication between said inlet port and diverting the flow of particulate material to a selected one of said plurality of outlet ports;

said inlet port said at least one outlet port being generally aligned along a common horizontal axis;

said rotating disc has an inlet surface, an opposite outlet surface engaging an inner surface of said outlet housing and an opening allowing for the flow to pass through to a selected one of said at least one outlet ports, said opening being radially displaced between an axis of said disc and a peripheral edge of said disc, an inflatable seal being disposed between said opening and said outlet housing for controlling the flow to said one of at least one outlet ports, said rotating disc has an inlet surface, an opposite outlet surface slidingly engaging an inner surface of said outlet housing, and each said seal is located between said outlet surface and said inner surface for contacting said rotating disc;

said rotating disc has a single opening allowing for the flow to pass through to a selected one of said outlet ports; and said rotating disc is provided with an axially projecting shaft extending from an outlet surface towards said outlet housing.

\* \* \* \* \*